US008866924B2

(12) United States Patent  
Tang et al.

(10) Patent No.: US 8,866,924 B2  
(45) Date of Patent: Oct. 21, 2014

(54) LOCAL IMAGE FEATURE DESCRIPTORS ACCORDING TO CIRCULAR DISTRIBUTION INFORMATION

(75) Inventors: Hao Tang, Mountain View, CA (US); Feng Tang, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 237 days.

(21) Appl. No.: 13/283,754

(22) Filed: Oct. 28, 2011

(65) Prior Publication Data

US 2013/0107071 A1    May 2, 2013

(51) Int. Cl.  
*H04N 5/228* (2006.01)  
*G06K 9/46* (2006.01)

(52) U.S. Cl.  
CPC .................................... *G06K 9/4671* (2013.01)  
USPC .......... 348/222.1; 382/168; 382/170; 382/173

(58) Field of Classification Search  
USPC ........ 348/222.1; 382/168, 170–173, 190–197  
See application file for complete search history.

(56) References Cited

U.S. PATENT DOCUMENTS

| 6,711,293 | B1 | 3/2004 | Lowe |
| 7,379,627 | B2 | 5/2008 | Li et al. |
| 2007/0014435 | A1* | 1/2007 | Mirowski et al. ............. 382/109 |
| 2009/0022472 | A1 | 1/2009 | Bronstein et al. |
| 2010/0080469 | A1* | 4/2010 | Liu et al. ........................ 382/201 |
| 2010/0226575 | A1 | 9/2010 | Grzeszczuk et al. |
| 2011/0142350 | A1* | 6/2011 | Tang et al. .................... 382/195 |

FOREIGN PATENT DOCUMENTS

| EP | 1482447 | 1/2004 |
| WO | 2008003985 | 1/2008 |

OTHER PUBLICATIONS

Laptev, Improvements of Object Detection Using Boosted Histrograms, British Machine Vision Conference BMVC, 2006, 10 pages.  
Lowe, Distinctive Image Features from Scale-Invariant Keypoints, International Journal of Computer Vision 60, 2(2004), pp. 91-110.

* cited by examiner

*Primary Examiner* — Antoinette Spinks

(57) ABSTRACT

A method and system characterizes an image of an object. A plurality of interest points are detected within a first image and a local image feature descriptor is built for at least some of the interest points, including mapping information about the interest points according to at least circular distribution information.

8 Claims, 5 Drawing Sheets

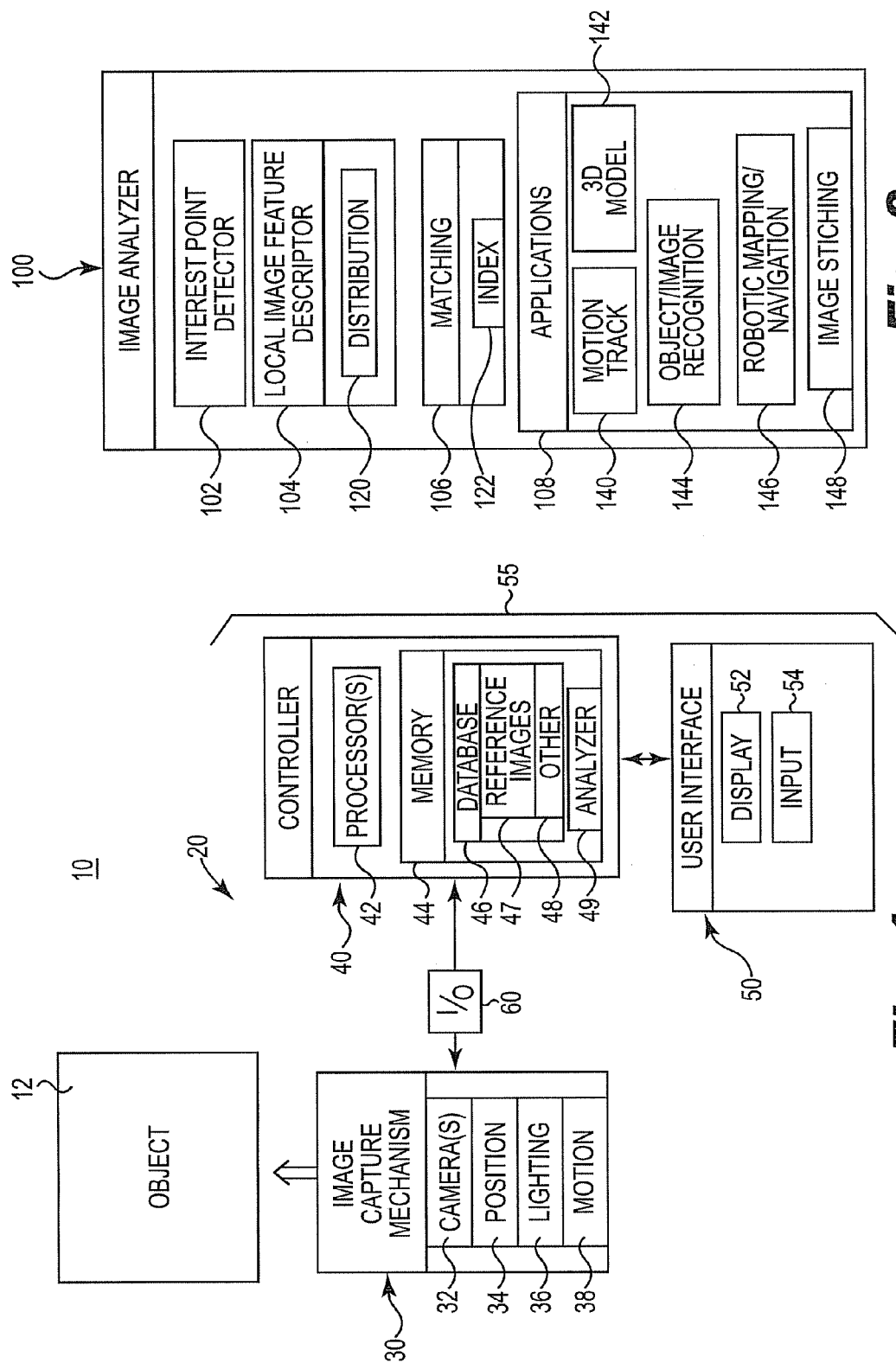

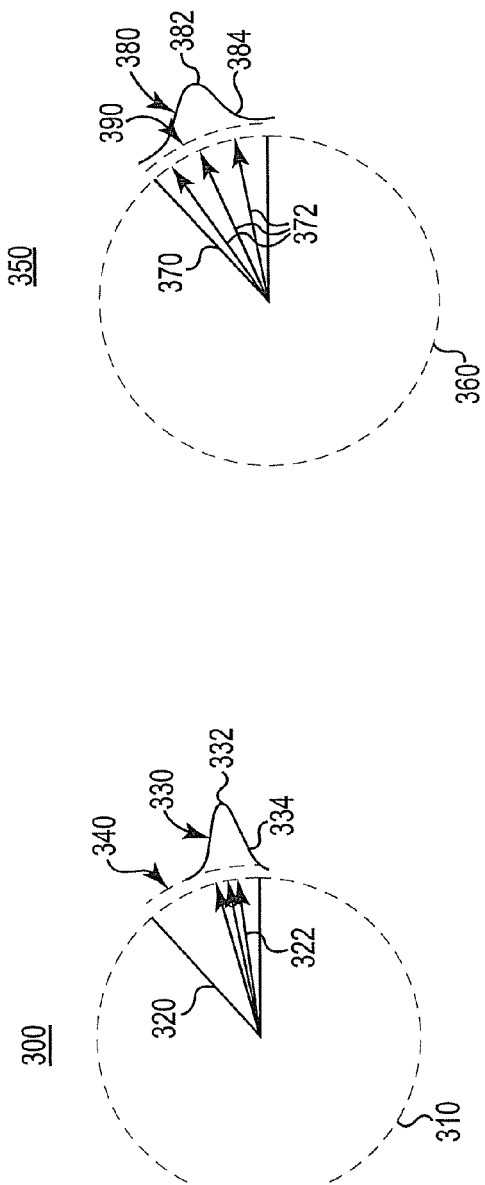

LOCAL IMAGE FEATURE DESCRIPTORS ACCORDING TO CIRCULAR DISTRIBUTION INFORMATION

BACKGROUND

Many computer vision applications, such as motion tracking, image recognition, and three-dimensional modeling, involve detecting and describing portions of an image. In doing so, it has become popular to use local image feature descriptors such as provided via the scale-invariant feature transform (SIFT) method. In this method, various local image features within an image are detected and described. In particular, an interest point detector selects interest points indicative of the content of the image while a local image feature descriptor describes the characteristics of each interest point and its neighborhood (i.e., a local image patch). Among other features, a local image feature descriptor indicates oriented gradients for the interest point and its neighborhood. As one aspect of characterizing the local features of an image, the oriented gradients of the local image patch are mapped according to a probabilistic model, such as a histogram which represents a data distribution of the oriented gradients.

Despite the general utility of local image feature descriptors in representing local features of an image, some computer vision applications perform less admirably than desired.

BRIEF DESCRIPTION OF THE DRAWINGS

FIG. 1 is a block diagram schematically illustrating an example image analyzer system.

FIG. 2 is a block diagram schematically illustrating an example image analyzer module.

FIGS. 4A-4C is a series of example partial angular-based histograms.

DETAILED DESCRIPTION

Figure 3:
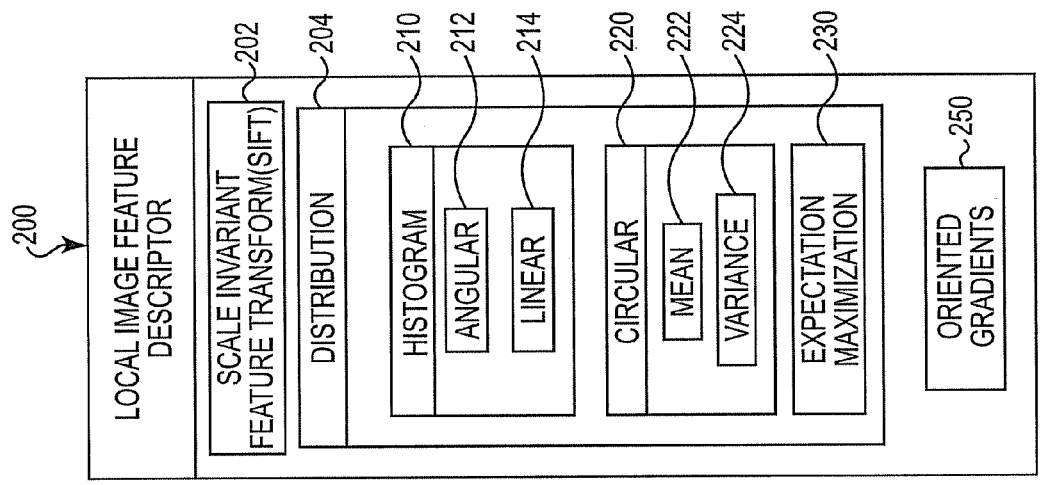
FIG. 3 is a block diagram schematically illustrating an example local image feature descriptor module.
Figure 5A:
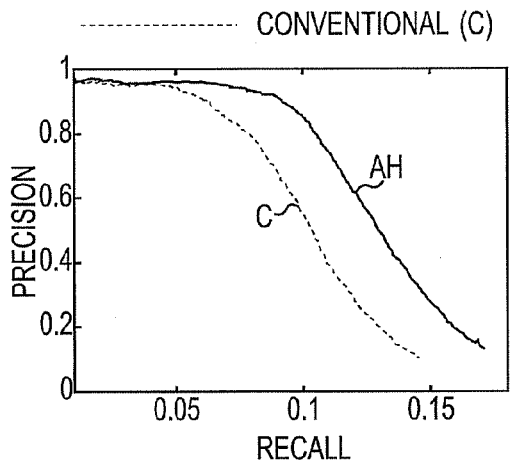
FIGS. 5A-5E is a series of example diagrams schematically illustrating a precision-recall curve representing a relative effectiveness of local image feature descriptors for images undergoing transformations.
Figure 5B:
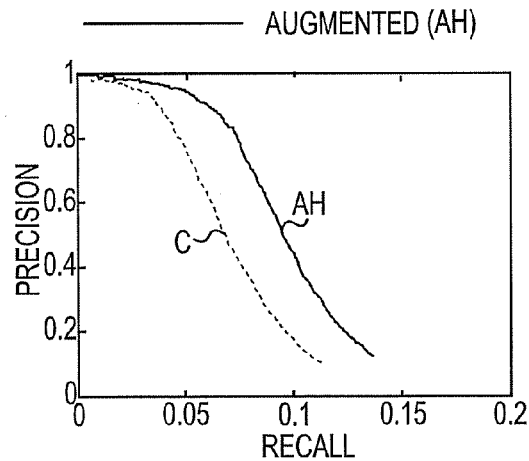
Figure 5C:
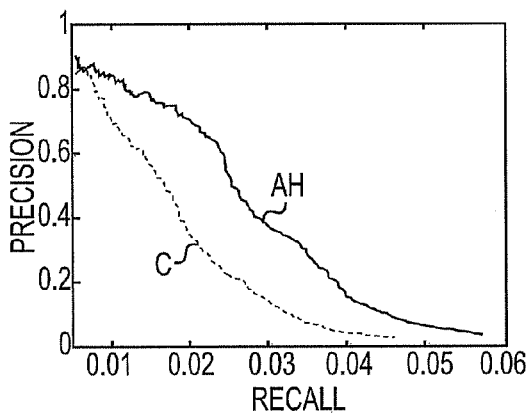
Figure 5D:
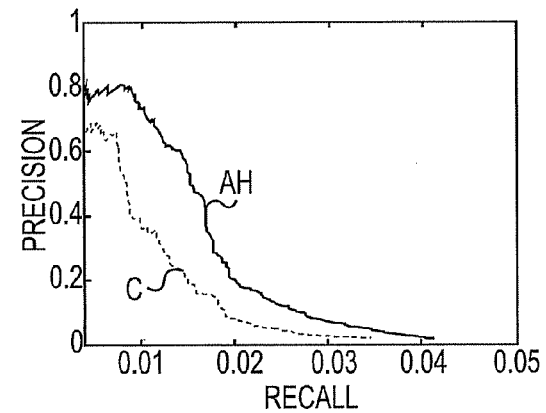
Figure 5E:
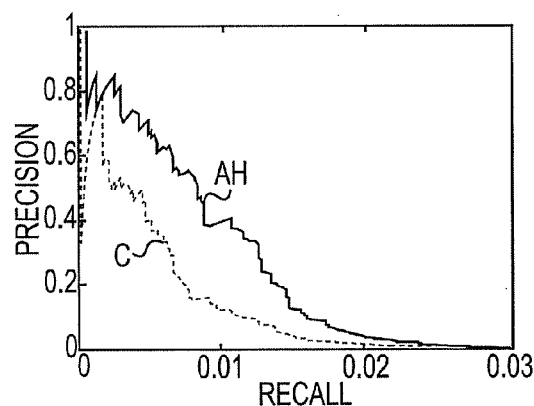

In the following detailed description, reference is made to the accompanying drawings which form a part hereof, and in which is shown by way of illustration specific embodiments of the present disclosure which may be practiced. In this regard, directional terminology, such as "top," "bottom," "front," "back," "leading," "trailing," etc., is used with reference to the orientation of the Figure(s) being described. Because components of embodiments of the present disclosure can be positioned in a number of different orientations, the directional terminology is used for purposes of illustration and is in no way limiting. It is to be understood that other embodiments may be utilized and structural or logical changes may be made without departing from the scope of the present disclosure. The following detailed description, therefore, is not to be taken in a limiting sense.

As used herein, the term "includes" means includes but not limited to, the term "including" means including but not limited to. The term "based on" means based at least in part on.

Examples of the present disclosure are directed to enhancing the representational power of histogram-based local image feature descriptors. In one example, this enhancement occurs via augmenting the histogram of local image features. In another example, a distribution of local image features is represented by circular distribution information. In some examples, this circular distribution information is modeled by a mixture of circular normal distributions learned through an expectation maximization (EM) function. In one aspect, a set of circular means and variances provided by the circular normal distributions represents how data samples are distributed within a given bin of an angular-based histogram. By doing so, local image feature descriptors more accurately specify locations and grouping of data samples, such as oriented gradients, which in turn, enables more accurate matching when local image feature descriptors of the image are compared with local image feature descriptors of reference images.

This augmented histogram method produces a modified SIFT-based local image feature descriptor that significantly outperforms the unmodified SIFT-based local image feature descriptor when both are applied to matching of real-world images that undergo various levels of different geometric and photometric transformations, such as blurring, zoom/rotation, lighting changes, viewpoint changes, and JPEG compression.

These examples, and additional examples, are described and illustrated in association with FIGS. 1-6.

FIG. 1 is a diagram 10 schematically illustrating an object 12 and an image analyzer system 20, according to an example of the present disclosure. As shown in FIG. 1, image analyzer system 20 includes an image capture mechanism 30, controller 40, and user interface 50. The image capture mechanism 30 is configured to capture digital images of object 12. In one example, the image capture mechanism 30 comprises a camera 32 such as still photo camera and/or movie camera. In other examples, image capture mechanism 30 includes a scanner or a light sensitive photo circuitry element. Components of the image capture mechanism 30 are capable of being maneuvered into different positions 34, used with variable lighting 36, and/or can be placed in motion 38.

In one example, controller 40 comprises at least one processor 42 and associated memories 44 configured to generate control signals directing the operation of system 20. In one example, memory 44 stores a database 46 of reference images 47 (and other images/information 48) and an image analyzer module 49. In response to or based upon commands received via user interface 50 and/or instructions contained in the memory 44 associated with controller 40, controller 40 generates control signals directing operation of analyzer module 49.

For purposes of this application, in reference to the controller 40 the term "processor" shall mean a presently developed or future developed processing unit that executes sequences of machine readable instructions contained in a memory. Execution of the sequences of machine readable instructions causes the processor 42 to perform actions such as obtaining an image, detecting local features within an image, producing descriptors of local features, comparing local features of an image with local features of reference images, etc. Memory 44 stores, among other things, images including both reference images and new images to be evaluated. In one example, the instructions to be executed by processor 42 are loaded in a random access memory (RAM) for execution by the processing unit from a read only memory (ROM), a mass storage device, or some other persistent non-volatile storage, as represented by memory 44. In other examples, hard wired circuitry may be used in place of or in combination with machine readable instructions (including software) to implement the functions described. For example, controller 40 may be embodied as part of at least one application-specific integrated circuit (ASIC). Unless otherwise specifically noted, the controller is not limited to any specific combination of hardware circuitry and machine readable instructions (including software), nor limited to any particular source for the instructions executed by the processor 42.

More broadly speaking, in some examples, memory 44 includes, but is not limited to, volatile and nonvolatile, removable and non-removable media implemented in any method or technology for storage of information such as computer or machine readable instructions, data structures, program modules, functions, or other data. Computer storage media includes, but is not limited to, RAM, ROM, EEPROM, flash memory or other memory technology, CD, digital versatile disks (DVD) or other optical storage, magnetic cassettes, magnetic tape, magnetic disk storage or other magnetic storage devices, or any other media which can be used to store the desired information and which can be accessed by processor 42 and its related functions.

Examples of the present disclosure are provided in part in the general context of computer-executable instructions, such as program modules, executed by at least one computer or device. Generally, program modules include routines, programs, objects, components, data structures, etc. that perform particular tasks or implement particular data types (in relation to objects within captured image). Typically, the functionality of the program modules may be combined and/or distributed as desired in various examples.

For purposes of illustration, programs, modules, functions, and/or other executable program components are illustrated as discrete blocks, although it will be understood that such programs and components reside at various times in different storage components of the computer (e.g. memory 44), and are executed by the data processor 42 of the computer.

User interface 50 is configured to enable a user to view information relating to the image of the object, as well as, information enabling operation and monitoring of the various functions of the image analyzer system 20. In one aspect, user interface 50 includes a display 52 and an input device 54. In one example, user interface 50 comprises a graphical user interface (GUI) that combines the display 52 and input device 54 into a single component, and which may or may not include touch pad features. In other examples, the display 52 and input device 54 are provided via separate or different components.

In one example, image analyzer system 20 include a communication input/output 60, which enables communication of images and control signals between image capture mechanism 30 and other components of image analyzer system 20.

In one example, controller 40, user interface 50, communication input/output 60 are combined into a computer 55.

FIG. 2 is a block diagram schematically illustrating an image analyzer module 100, according to an example of the present disclosure. In one example, image analyzer module 100 includes at least substantially the same features and attributes as image analyzer 49, as previously described and illustrated in association with FIG. 1. As shown in FIG. 2, image analyzer module 100 comprises interest point detector module 102, local image feature descriptor module 104, matching module 106, and applications module 108.

In some examples, the interest point detector module 102 and local image feature descriptor module 104 are implemented according to scale-invariant feature transform (SIFT) methodology. In non-limiting examples, the implementation is performed based on the principles described and illustrated in Lowe U.S. Pat. No. 6,711,293 and/or Lowe, *Distinctive Image Features from Scale-Invariant Keypoints*, International Journal of Computer Vision, 2004. Moreover, the local image feature descriptor 104 includes a distribution parameter 120 configured to map a distribution of certain aspects of local image features, such as oriented gradients, associated with each local image patch. The distribution parameter 120 will be later described in more detail in association with at least FIGS. 3-5.

Matching module 106 compares local image feature descriptors of a subject image to local image feature descriptors of a stored reference image(s) 47 in database 46. In some examples, local image feature descriptors of reference images 47 are categorized via index 122 to facilitate comparison and matching. In one example, along with the stored reference images 47, database 46 stores local image feature descriptors associated with the reference images and available for comparison with local image feature descriptors of new images to be evaluated. In one example, the index 122 includes information categorizing and/or classifying the local image feature descriptors according to known object (e.g. automobile, tree, etc.) or portion of a known object (e.g., fender, branch with leaves, etc.).

In some examples, the local image feature descriptors associated with the reference images 47 are built according to the same or substantially the same method of building local image feature descriptors as are used to build local image feature descriptors to characterize local image features in new images, which are evaluated or manipulated relative to the reference images 47.

In general terms, applications module 108 is configured to provide computer vision applications, which use the interest point detector module 102, local image feature descriptor module 104, and matching module 106 to perform computer vision tasks, such as recognition, tracking, and comparing images (or portions of images) to accomplish a goal relating to those images and/or objects in those images. In one example, applications module 108 includes, but is not limited to, a motion tracker 140, a three-dimensional (3D) modeler 142, an object/image recognizer 144, a robotic mapping navigation function 146, and/or an image stitching function 148.

For example, in one example, motion tracker module 140 tracks the motion and/or position of a real world object using at least one camera 32, which obtains and supplies images of the object. Via image analyzer system 100, successive images are compared with reference images of an object of interest to identify and track the real world object.

In another example, object recognition module 144 identifies objects by evaluating an image relative to a database of reference images of known objects (e.g., baseball, car, chair, banana, etc.). In a similar fashion, in some examples, object recognition module 144 used to identify people (e.g., identity, gender, etc.) relative to reference images.

In one example, robotic mapping/navigation module 146 determines and controls a position and/or motion of robotic components via using image comparison of successive portions of robotic components.

Other examples of computer vision applications that use local image descriptors in examples of the present disclosure include image stitching 148 and/or 3D modeling.

FIG. 3 is a block diagram of a local image feature descriptor module 200, according to an example of the present disclosure. In one example, local image feature descriptor module 200 includes at least substantially the same features and attributes as local image feature descriptor module 104, as previously described and illustrated in FIG. 2.

As shown in FIG. 3, local image feature descriptor module 200 includes, among other things, a scale-invariant feature transform (SIFT) function 202 and a distribution mapping module 204. The distribution mapping module 204 includes a histogram module 210, a circular distribution function 220, and an expectation maximization function 230.

In general terms, the SIFT function 202 describes local features of an image, thereby enabling comparison with local features of other images, such as reference images. The SIFT function 202 uses an interest point detector and a local image feature descriptor to identify and characterize local features within an image. In particular, via SIFT function 202, the interest point detector localizes interest points in scale space which are likely to be stable under various geometric and photometric image transformations. Accordingly, in some examples, the interest point detector (such as interest point detector module 102) performs some sorting among the initially detected interest points and retains the more stable interest points as pertinent interest points for use by the interest point descriptor of the SIFT function 202. In one example, local image feature descriptor module 104 builds local image feature descriptors for each pertinent interest point.

In general terms, an interest point refers to a location in an image around which the local image structure is rich in terms of local image contents. In addition, an interest point is stable under local and global perturbations in the image domain. For example, highly textured locations such as corners and blobs in an image are considered candidates of interest points. In some instances, interest points also are defined as maxima and minima of the result of difference of Gaussians function applied in scale-space to a series of smoothed and resampled images, such as in the context of scale-invariant feature transform (SIFT) methodology.

In some examples, prior to any sorting, interest point detector module 102 employs other mechanisms for detecting interest points, such as densely selecting sample locations in the image. In one example, the detector selects all the pixel locations in the image as interest points. In another example, the detector selects interest points at every few pixels in the image.

In some examples, via distribution mapping module 204, the SIFT function 202 builds a local image feature descriptor, which embodies a description of each pertinent interest point (as provided by the interest point detector) via computation of a histogram of oriented gradients of a local image patch centered at the respective interest point. Specifically, the local neighborhood of an interest point is divided into 4 by 4 image patches, each of which is represented by a histogram of gradients with 8 oriented bins. This results in a 128-dimensional SIFT feature vector for an interest point. In addition, heuristics are employed such as thresholding the histogram to remove elements with small values and smoothing the histogram with an ad hoc interpolation scheme to avoid boundary effects. Accordingly, the distribution mapping module 204 represents the portion of the SIFT function 202 that enables mapping a distribution of certain aspects of local image features, such as oriented gradients.

In one example, the histogram is determined via histogram module 210 according to an angular orientation parameter 212. In other examples, the histogram module 210 maps a histogram according to a linear orientation parameter 214.

In one example, via angular orientation parameter 212 of histogram module 210, the SIFT function 202 operates in cooperation with circular distribution module 220 of distribution mapping module 204. The circular distribution function 220 enables further characterizing or mapping certain aspects of local image features, such as oriented gradients, in association with the histogram module 210. In other words, circular distribution function 220 augments a histogram used to build local image feature descriptors for an image.

In one example, the circular distribution function 220 is based on at least a circular distribution of data. In some examples, the circular distribution of data is provided via a mixture of circular normal distributions such that circular distribution function 220 provides an array of statistics that summarize the distribution. In one example, the statistical array provided via circular distribution function 220 includes a mean parameter 222 and a variance parameter 224. The mean parameter 222 indicates a mean value for a distribution of data points within a given bin of a histogram. In other words, the mean parameter 222 indicates a general location within the bin at which the data samples are centered. The variance parameter 224 indicates a degree of variance of data points across the circular distribution. In other words, the variance parameter 223 indicates how closely bunched or spaced apart the data points are in a given bin of histogram. Both mean parameter 222 and variance parameter 224, along with expectation maximization function 230, are described more fully below as part of a general description of circular distribution information used to augment histograms used when deploying SIFT methodology.

FIGS. 4A-4C are a series of diagrams schematically illustrating application of circular normal distributions to map the distribution of local image features, according to an example of the present disclosure. In one example, these diagrams represent the application of the methods and systems in examples of the present disclosure as previously described and illustrated in association with FIGS. 1-3.

As shown in the diagram 300 of FIG. 4A, a representative bin 320 of unit circle 310 includes several data samples 322. In one aspect, each data sample represents a local image feature, such as an oriented gradient, associated with an interest point of an image. In FIGS. 4A, 4B, 4C, each data sample (e.g., 322, 372, 422, respectively) is depicted by a directional arrow extending from a center of the unit circle to a perimeter of the circle. The circular normal distribution 330 characterizes the relative position of the multiple data samples 322 within bin 320. In one aspect, circular normal distribution 330 includes a mean 332, which represents a circular mean of the data samples 322. The circular normal distribution 330 also includes a variance 334, which represents how closely grouped (or spaced apart) the respective data sample are to each other within bin 320.

In diagram 300 of FIG. 4A, the data samples 322 are closely grouped together, such that variance 334 is small, resulting in a relatively narrow curve. The distribution also indicates that the group of data samples 322 is located closer to one side (e.g. a bottom side) of the 320 than the other, as represented by the relative location of mean 332.

In diagram 350 of FIG. 4B, the data samples 372 are generally spaced apart by a somewhat uniform distance, such that variance 384 is relatively large, resulting in a relatively broad distribution curve 380. The distribution 380 also indicates that the group of data samples 372 are spread generally uniformly throughout the bin (from an angular perspective) such that mean 382 is generally centrally located in bin (from an angular perspective).

In diagram 400 of FIG. 4C, the data samples 422 are closely grouped together with a small variance 434, resulting in a relatively narrow circular normal distribution curve 430.

The distribution also indicates that the group of data samples 422 is located closer to one side (e.g. an upper portion) of the bin 320 than the other. As in FIG. 4A, the circular normal distribution curve 430 in FIG. 4C is generally narrow as compared to the circular normal distribution curve 432 in FIG. 4B, in which the spaced apart data samples 372 result in a generally wider or broader circular normal distribution curve 380.

In contrast, an unmodified histogram-based SIFT descriptor may not be capable of distinguishing among the three different patterns shown in FIGS. 4A-4C. For example, an unmodified histogram is represented by an arc of dashed lines 340 in FIG. 4A, an arc of dashed lines 390 in FIG. 4B, and an arc of dashed lines 440 in FIG. 4C. Without the array of statistical information (such as a circular mean and variance) associated with a circular normal distribution as provided in examples of the present disclosure, the unmodified histogram as represented by dashed lines 340, 390, 440 in the unit circle of FIGS. 4A, 4B, 4C reveals no information representing the actual distribution of data samples within a given bin.

Unlike unmodified histograms used in SIFT descriptors, the local image feature descriptors built by SIFT function 202 with circular distribution module 220, according to examples of the present disclosure, enable more accurate description of local image features, which in turn, enables more accurate comparison and matching of local image features in one image with local image features in other images.

With this in mind, the theory, structure, and operation of circular distribution module 210, according to examples of the present disclosure, are further described below.

In probability theory and directional statistics, the circular normal distribution (a.k.a. the von Mises distribution) is a continuous probability density function of an angular random variable. It may be thought of as an extension of the normal or Gaussian distribution from the Euclidean metric space to the unit circle. The functional form of the circular normal distribution for an angular random variable x is given by $$F(x|\mu, \kappa) = \frac{1}{2\pi I_0(\kappa)} e^{\kappa \cos(x-\mu)} \quad (1)$$

where $I_0(\bullet)$ represents the modified Bessel function of the first kind and order zero. The parameters $\mu$ and $\kappa$ are analogous to the mean ($\mu$) and precision or inverse variance ($\rho=1/\sigma^2$) of the normal distribution, and are referred to as the circular mean and concentration parameter. The concentration parameter $\kappa$ characterizes how strongly the angles drawn randomly according to $F(x|\mu, \kappa)$ are concentrated about the circular mean $\mu$. In the limit of large $\kappa$, i.e. when $\kappa \to \infty$, $F(x|\mu, \kappa)$, becomes a normal distribution, and in the limit of small $\kappa$, i.e. when $\kappa \to 0$, $F(x|\mu, \kappa)$ becomes a uniform distribution on the unit circle.

In addition, consideration is given to a mixture of K circular normal distributions, given by $$P(x) = \sum_{k=0}^{K-1} \omega_k F_k(x) \quad (2)$$

where $F_k(x)$ is a circular normal distribution of the form in Equation (1) with circular mean $\mu_k$ and concentration parameter $\kappa_k$. P(x) is completely determined by the parameters $$\{\omega_k, \mu_k, \kappa_k\}_{k=0}^{K-1}.$$

To estimate P(x) from a training data set $$X = \{x_i\}_{i=0}^{N-1}$$

an expectation maximization (EM) function is derived as follows.

In one example the expectation maximization (EM) function described below corresponds to the expectation maximization (EM) function 230 of distribution module 204, as described and illustrated in association with FIG. 3.

In one example, instead of random initialization, the function starts with a mixture of circular uniform distributions represented by $$F_k^{(0)}(x_i) = U_k(x_i) \quad (3)$$

Here, the superscript (0) denotes the iteration number. In the expectation (E) portion, a posterior probability of component k is computed, given data sample $X_i$ as $$P(k|x_i) = \frac{\omega_k F_k^{(0)}(x_i)}{\sum_{m=0}^{K-1} \omega_m F_m^{(0)}(x_i)}. \quad (4)$$

In the maximization (M) portion, the parameters of the mixture model $$\{\omega_k, \mu_k, \kappa_k\}_{k=0}^{K-1}$$

are re-estimated as follows:

$$\hat{\omega}_k = \frac{1}{N} \sum_{i=0}^{N-1} P(k|x_i) \quad (5)$$

$$\hat{r}_k = \sum_{i=0}^{N-1} P(k|x_i) y_i \quad (6)$$

where $Y_i$ is the 2D vector representation of the angular direction $X_i$ computed as $$y_i = \begin{bmatrix} \cos x_i \\ \sin x_i \end{bmatrix} \quad (7)$$

and $\hat{r}_k$ is the mean resultant vector. To yield estimates for the circular mean and concentration parameter from the mean resultant vector, the following relations are used:

$$\begin{bmatrix} \cos \hat{\mu}_k \\ \sin \hat{\mu}_k \end{bmatrix} = \frac{\hat{r}_k}{\|\hat{r}_k\|} \quad (8)$$

$$\frac{I_1(\hat{\kappa}_k)}{I_0(\hat{\kappa}_k)} = \|\hat{r}_k\| \quad (9)$$

where $I_1(\bullet)$ denotes the modified Bessel function of the first kind and order one.

In general, the above expectation maximization (EM) function takes a few iterations to converge. If, in the re-estimation process, a constraint is imposed that just the mixture weights $$\{\omega_k\}_{k=0}^{K-1}$$

are allowed to be updated, then the expectation maximization (EM) function converges in a single iteration, and the estimated model reduces to a histogram. This result indicates that the unmodified histogram used as part of a SIFT descriptor is a special case for the modeling with a mixture of circular normal distributions.

As more fully demonstrated below, the use of a mixture of circular normal distributions to model the distribution of local image features in the context of local image feature descriptors yields a gain of information over the use of the unmodified histogram.

As previously noted, in examples of the present disclosure, via circular distribution module 220, a mixture of circular normal distributions augments the histogram representation in the SIFT local image feature descriptor. Moreover, empirical test results have demonstrated that a single iteration of the expectation maximization (EM) function (e.g. function 230 in FIG. 3) was sufficient to cause significantly better performance of the SIFT-based local image feature descriptor when augmented by circular distribution information, such as a mixture of circular normal distributions. While it is possible that additional iterations of the expectation maximization (EM) function might result in even better performance of the local image feature descriptor, this benefit may come at a larger computational cost. In addition, it turns out that when performing a single iteration of the expectation maximization (EM) function, the result takes a simple form equivalent to augmenting the histogram $$\Omega = \{\omega_k\}_{k=0}^{K-1}$$

with a set of circular means $$M = \{\mu_k\}_{k=0}^{K-1}$$

and circular variances $$\Sigma = \{\sigma_k^2\}_{k=0}^{K-1}.$$

Moreover, because the circular variance and concentration parameter are generally interchangeable in the field of directional statistics and because the circular variance is easier to obtain than the concentration parameter, examples of the present disclosure employ the circular variance instead of the concentration parameter. Accordingly, examples of the present disclosure employ an augmented histogram representation $$H = \begin{bmatrix} \Omega \\ \alpha M \\ \beta \Sigma \end{bmatrix} \quad (10)$$

where $\alpha$ and $\beta$ are two tunable parameters designed to control the relative contribution of the circular means (M) (e.g. means parameter 222 in FIG. 3) and variances ($\Sigma$) (e.g. variance parameter 224 in FIG. 3) compared to the general histogram ($\Omega$), respectively. In one example, $\alpha$ and $\beta$ are set to 0.2. The computation of the circular means (M) and variances ($\Sigma$) will be further described later.

In one aspect, the result in Equation (10) is termed an Augmented Histogram. As a natural result of modeling the distribution of local image features by a mixture of circular normal distributions learned through the expectation maximization (EM) function (e.g. function 230 in FIG. 3), the Augmented Histogram takes a form that augments the histogram of local image features with a set of circular means and variances. In contrast to the unmodified histogram (e.g. ad hoc-smoothed histogram) used in a SIFT local image feature descriptor, the augmented histogram in examples of the present disclosure significantly enhances the representational power of histogram-based local image feature descriptors.

In another aspect, the resulting descriptor based on Equation (10) has a dimension of 128 times 3, which equals 384 and can be referred to as an Augmented Histogram-Scale Invariant Feature Transform (AH-SIFT). In some examples, depending on the specific application, dimensionality reduction is performed to reduce the dimension of the AH-SIFT feature vectors to meet the needs of the individual applications.

In addition, when computing an unmodified histogram (e.g. ad-hoc smoothed histogram), a SIFT function takes into account the magnitude of the gradients and weights the gradients accordingly. It also considers position weights where gradients at locations closer to the interest point have larger contributions to the computed histogram.

In examples of the present disclosure that employ the augmented histogram (AH-SIFT), the weighting strategy via the SIFT function 202 is retained, and these weights are also incorporated into the computation of both the circular means and variances.

For example, the circular mean and variance are computed for a set of gradients $x_i$, weighted by the corresponding magnitudes $z_i$. To compute the circular mean, the angular direction $x_i$ is first transformed into a unit vector in the two dimensional space using Equation (7). In the transformed space, the mean resultant vector $r_k$ is obtained as $$r_k = \sum_{x_i \in bin_k} z_i y_i \bigg/ \sum_{x_i \in bin_k} z_i \quad (11)$$

To compute the circular mean $\mu_k$, the normalized mean resultant vector $r_k/\|r_k\|$ is transformed back into an angular direction using the four quadrant inverse tangent function.

In directional statistics, the length of the mean resultant vector $\|r_k\|$ is a relevant quantity for the measurement of the circular spread of the data samples. The closer this length is to one, the more concentrated the data sample is around the mean direction. The circular variance is closely related to the length of the mean resultant vector, and is computed as $$\sigma_k^2 = 1 - \|r_k\| \quad (12)$$

In contrast to the variance on a linear scale, the circular variance is bounded in the interval [0 1] and the circular variance (e.g. circular variance 224 in FIG. 3, and variance 334 in FIG. 4A) is indicative of the spread of angular data samples on the unit circle. If all data samples point into the same direction, the mean resultant vector has a length close to 1 and the circular variance is correspondingly small. If the data samples are spread out evenly around the circle, the mean resultant vector has length close to 0 and the circular variance is close to 1.

Local feature descriptors based on an augmented histogram that employs circular normal distributions, according to examples of the present disclosure, were evaluated over a set of real-world images which underwent various levels of different geometric and photometric transformations. These transformations include, but are not limited to, blurring, zoom/rotation, lighting changes, viewpoint changes, and JPEG compression. For each type of image transformation, five levels of distortions (small to large) were applied to the images.

In the test of a real-world image matching task, the performance of local image feature descriptors (using circular normal distributions via circular distribution module 220 in FIG.

3) according to examples of the present disclosure was compared to the performance of local image feature descriptors based on the unmodified histogram-based SIFT technique.

In one aspect, the performance was measured according to metrics based on the number of correct interest point matches and number of incorrect interest point matches obtained for an image and its transformation. To determine a "matched" interest point in transformed image B for an interest point in image A, the traditional criterion was applied in which a best candidate match of an interest point in A was found by its nearest neighbor in B in the descriptor space. In addition, the distance of the closest neighbor was compared to that of the distance of the second-closest neighbor. If the distance ratio is greater than a global threshold $\tau$ (e.g. $\tau=0.8$), the apparent match was rejected.

For each image in the evaluation data set, the local image feature descriptors of the image are compared to the local image feature descriptors of the transformed image and then the number of correct matches ($N_{correct}$) and the number of incorrect matches ($N_{incorrect}$) are counted. The value of the threshold $\tau$ is adjusted to obtain a different set of $N_{correct}$ and $N_{incorrect}$, which form a precision versus recall curve. Recall is defined to be the number of correct matches with respect to the number of groundtruth correspondences ($N_{groundtruth}$) between an image pair:

$$\text{recall} = \frac{N_{correct}}{N_{groundtruth}} \quad (13)$$

and precision is defined to be the number of correct matches relative to the number of total matches and is given by $$\text{precision} = \frac{N_{correct}}{N_{correct} + N_{incorrect}} \quad (14)$$

Precision and recall are two widely used metrics for evaluating the correctness of a pattern recognition method. The perfect performance gives a recall equal to 1 for any precision. For these computations, the recall metric normally increases for an increased threshold as the absolute number of correct matches likely increases. However, the precision metric may decrease as more and more matches turn out to be incorrect matches with higher thresholds. These metrics are typically illustrated graphically in a precision-recall curve, in which the precision metric is plotted relative to the recall metric, as shown in FIGS. 5A-5E and which will be further described below. In general terms, the bigger the area is under the precision-recall curve, the better the performance of the method in producing the local image descriptor.

The use of an augmented histogram employing a mixture of circular normal distributions (via circular distribution module 220), according to examples of the present disclosure, was evaluated by application of the augmented histogram to five categories of image transformations. In addition, for each category of transformation, the evaluation introduced five different levels of distortions (from small to large) to the images. In one example, the augmented histogram-based local image feature descriptor (AH-SIFT) and unmodified histogram-based local image feature descriptors (SIFT) were evaluated under blurring conditions using images of trees. The blurring effect was achieved via varying the focus of the camera.

In FIGS. 5A-5E, each respective frame plots a precision-recall curve, which represents the effectiveness of the augmented histogram-based local image feature descriptors according to examples of the present disclosure (represented by solid lines AH in FIGS. 5A-5E) as compared to unmodified histogram-based local image feature descriptors (represented by dashed lines C in FIGS. 5A-5E). Each frame represents the effectiveness of the local image feature descriptors upon one level or scale of transformation (e.g. blurring) of an image (e.g. trees).

As shown in FIG. 5, the area under the precision-recall curve for the augmented histogram local image feature descriptor (AH) is substantially greater than the area under the precision-recall curve for the unmodified histogram-based local image feature descriptor (C). Because the relative area under the precision-recall curves indicates the relative effectiveness of the respective local image feature descriptors, it will be apparent from FIG. 5 that the augmented histogram local image feature descriptors (AH) according to examples of the present disclosure significantly outperform unmodified histogram-based local image feature descriptors (C) under various degrees of distortions introduced by blurring.

Similar results were demonstrated under other conditions, such as varying degrees of zoom and rotation, varying degrees of illumination, varying viewpoint changes, and varying levels of image compression. It will be understood that these conditions merely represent examples and that the examples of the present disclosure operate as robust local image feature descriptors when experiencing other types of image transformations.

In the unmodified histogram-based SIFT technique, the dimension of the descriptor is 128, while in the augmented histogram method in examples of the present disclosure, the dimension of the local image feature descriptor is three times higher, namely, 384. In one aspect, while the augmented histogram method and system in examples of the present disclosure could add more overhead to the pattern recognition task than an unmodified histogram-based SIFT method, in some examples, a dimensionality reduction or a feature selection is performed on the local image feature descriptors. Regardless, because the augmented histogram method in examples of the present disclosure provides a significant gain of information useful for comparing and matching local image features, the use of a smart dimensionality reduction or feature selection technique enables exploiting this gain of information to generate more discriminative features in the low dimensional subspace. Therefore, it is believed that the general increase in the dimensionality of the descriptors in the examples of the present disclosure is a small cost compared to the large gain of information usable in comparing and matching local image features.

In some examples, multiple iterations of the expectation maximization (EM) function 230 are performed to learn the mixture of circular normal distributions model. The multiple iterations likely increase the accuracy of the model and lead to better performance of the descriptor.

However, in other examples, a single iteration of the expectation maximization (EM) function 230 is performed because it is believed that the multiple iterations (as compared to a single iteration) do not substantially increase the accuracy while incurring a noticeable computational cost. In another aspect, by performing just a single iteration of the expectation maximization (EM) function 230, the result becomes the augmented histogram.

In one example, the augmented histogram method according to examples of the present disclosure is applied within a Bayesian framework, in which training the mixture of circular normal distributions model is initiated with a circular normal distribution learned from an independent training data set instead of starting with a mixture of uniform distributions.

To better understand the limitations of the unmodified histogram (in a SIFT scheme), especially as compared to the circular normal distribution in examples of the present disclosure, it is fruitful to further consider the histogram as a modeling tool regarding the distribution of data samples, which each display the angular direction of an oriented gradient extracted from a local image patch. In particular, the unmodified histogram can be understood as a non-parametric technique for probability density estimation, which does not assume any particular parametric form of the probability density function.

Nevertheless, one can view the histogram as a result of parametric probability density modeling. Because most local image feature descriptors are based on the histogram of oriented features such as the intensity gradients, it can be assumed that the histogram is a probabilistic model of an angular random variable x that takes on radian values in the interval $[0 \ 2\pi]$. Moreover, it is demonstrated that the histogram can be formulated as a mixture of uniform distributions, and that the estimation of the histogram from data samples can be obtained through a standard expectation maximization (EM) function.

With this in mind, suppose a mixture probabilistic model $$P(x) = \sum_{k=0}^{K-1} \omega_k U_k(x) \qquad (15)$$

where $U_k(x)$ is a uniform distribution of the form $$U_k(x) = \begin{cases} \frac{1}{2\pi/K} & \text{if } \frac{2\pi k}{K} \leq x < \frac{2\pi(k+1)}{K} \\ 0 & \text{if otherwise} \end{cases} \qquad (16)$$

and $\omega_k$ is the mixture weight of the $k^{th}$ component distribution ($U_k$) that satisfies the constraint $$\sum_{k=0}^{K-1} \omega_k = 1 \qquad (17)$$

The above mixture probabilistic model is called a mixture of uniform distributions, and is completely determined by its K parameters $$\{\omega_k\}_{k=0}^{K-1} \qquad (18)$$

Given an example training data set consisting of N data samples $$X = \{x_i\}_{i=0}^{N-1},$$

the parameters of the mixture probabilistic model in Equation (15) may be learned through the expectation maximization (EM) function 230. In the expectation (E) portion, the posterior probability of component k given data sample $x_i$ is computed as $$P(k \mid x_i) = \frac{\omega_k U_k(x_i)}{\sum_{m=0}^{K-1} \omega_m U_m(x_i)} \qquad (19)$$

From the definition of $U_k$ in Equation (16), the posterior probability in Equation (19) becomes $$P(k \mid x_i) = \begin{cases} 1 & \text{if } \frac{2\pi k}{K} \leq x_i < \frac{2\pi(k+1)}{K} \\ 0 & \text{if otherwise} \end{cases} \qquad (20)$$

In the maximization (M) portion, the parameters of the mixture probabilistic model are re-estimated as $$\hat{\omega}_k = \frac{1}{N} \sum_{i=0}^{N-1} P(k \mid x_i) = \frac{N_k}{N} \qquad (21)$$

where $N_k$ denotes the number of training data samples that fall within the interval $$\frac{2\pi k}{K} \leq x_i < \frac{2\pi(k+1)}{K}.$$

The above expectation maximization (EM) function 230 always converges in a single iteration, and the result in Equation (21) turns out to be a recognized estimation formula for the histogram.

From a parametric modeling point of view, the histogram is governed by a set of K parameters $\{\omega_k\}_{k=0}^{K-1}$.
which coarsely specify the values of the distribution at K evenly-spaced anchor locations. This certainly limits the capability and flexibility of the histogram to represent a rich family of probability density functions. It is worth noting that although the modeling capacity of the histogram can be increased by increasing the number of histogram bins K, this increase can cause severe over-fitting to the training data and lead to poor estimates of the distribution.

To appreciate the incapability of the unmodified histogram as an effective probabilistic model to characterize the distribution of local image features, further reference is made to the example diagrams illustrated in FIGS. 4A-4C. In particular, as previously noted in association with FIGS. 4A-4C, without the circular mean (e.g. mean 332 in FIG. 4A) and the circular variance (e.g. variance 334 in FIG. 4A), the remaining unmodified histogram 340 yields no information regarding the distribution of data samples within a given bin 320. In any of the cases illustrated in FIGS. 4A-4C, the different variations of the data samples inside the example bin cannot be captured by the unmodified histogram (e.g. 340, 390, 440), which is in essence a mixture of uniform distributions.

Increasing the number (K) of histogram bins may sometimes alleviate this difficulty. However, in addition to introducing more computations and causing more edge effects, naively increasing the number (K) of bins leads to a smaller number of data samples that fall within a bin, likely resulting in a poorly estimated histogram that is far from representing the true probability distribution. Motivated by the parametric modeling view of the histogram, examples of the present disclosure replace the uniform distributions for the individual histogram bins with more powerful and meaningful probability distributions, namely, the circular normal distributions (i.e., normal distributions along the unit circle). In this way, the distribution of oriented gradients is modeled by a mixture of circular normal distributions. As illustrated, using a mixture of circular normal distributions, examples of the present disclosure are able to accurately characterize the differences between the three different cases shown in FIGS. 4A-4C.

Examples of the present disclosure which augment a histogram with circular distribution information, such as the circular means and variances of a mixture of circular normal distributions, produces substantially more information about the data samples, such as oriented gradients. With this additional information incorporated within the resulting local image feature descriptors, better image matching is performed when local image feature descriptors of an image are compared with local image feature descriptors of reference images. In particular, even under varying conditions such as blurring, zoom, rotation, lighting changes, viewpoint changes, and image compression, examples of the present disclosure outperform unmodified histogram-based local image feature descriptors by finding more correct matches (between the local image feature descriptors of the image and the local image feature descriptors of reference images) while minimizing the number of incorrect matches. In this way, more accuracy is gained in a wide variety of computer vision applications.

Figure 6:
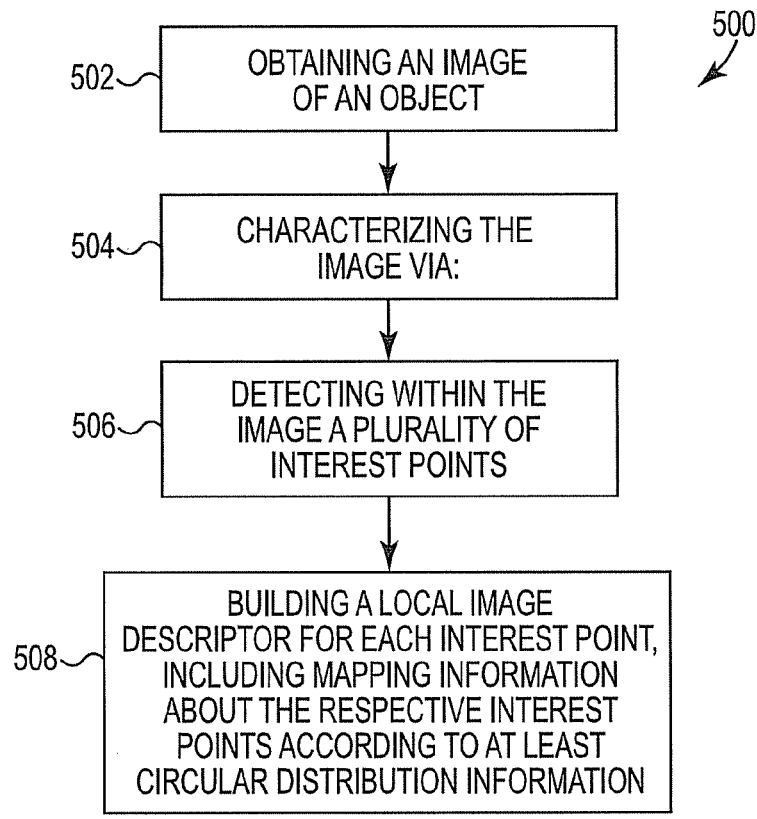
FIG. 6 is an example flow diagram schematically illustrating a method of characterizing images via local image feature descriptors.

FIG. 6 is a flow diagram schematically illustrating a method 500 of characterizing an image via local image feature descriptors, according to an example of the present disclosure. In one example, method 500 is performed via the systems, apparatuses, modules, and/or components previously described in association with FIGS. 1-5E while in other examples, method 500 is performed using other systems, devices, modules, elements, and/or components.

As shown in FIG. 6, at 502 method 500 includes obtaining an image of an object. The image is obtained via capturing the image using a camera, scanner, and the like or obtained via retrieving the image from a storage medium, such as when the image has been previously captured.

At 504, method 500 includes characterizing the image via the aspects described and illustrated at 506 and 508.

At 506, method 500 includes detecting a plurality of interest points within the image. In some examples, method 500 omits some of the interest points that are poorly defined or susceptible to noise, while retaining the more robust interest points as pertinent interest points.

However, in some examples, interest points of an image have been previously identified and information about those interest points stored along with the image itself. Accordingly, when such images are retrieved (in order to build local image feature descriptors), a set of interest points are already available for using in building local image feature descriptors.

At 508, method 500 includes building a local image descriptor for each interest point, including mapping information about the respective interest points according to at least circular distribution information.

Figure 7:
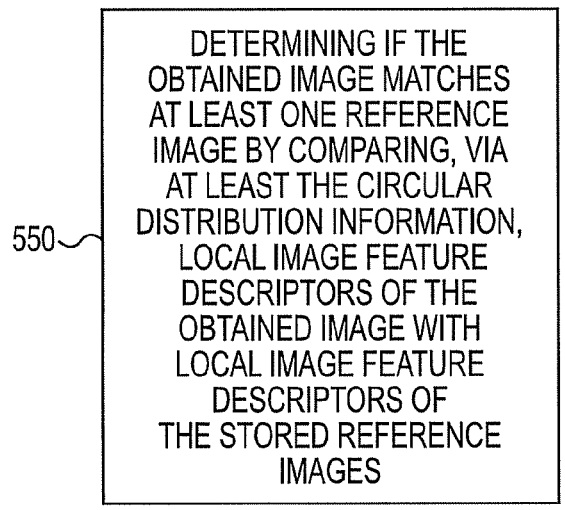
FIG. 7 is an example flow diagram schematically illustrating a portion of a method of characterizing images via local image feature descriptors.

As shown in FIG. 7, in some examples, method 500 further includes determining if the obtained image matches at least one reference image (or a portion thereof) by comparing local image feature descriptors of the obtained image with local image feature descriptors of the stored reference images, as shown at 550. In one aspect, the comparison is performed with reference to the circular distribution information incorporated within the local image feature descriptors of the obtained image.

Examples of the present disclosure are directed to enhancing the representational power of histogram-based local image feature descriptors. In one example, this enhancement occurs via augmenting the histogram of local image features with a set of circular means and variances. This augmentation is accomplished via modeling the distribution of local image features by a mixture of circular normal distributions learned through the expectation maximization function. This augmented histogram method uses circular normal distributions to produce a SIFT local image feature descriptor that outperforms the unmodified histogram-based local image feature descriptor when applied to matching of real-world images that undergo various levels of different geometric and photometric transformations, such as blurring, zoom/rotation, lighting changes, viewpoint changes, and JPEG compression.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

What is claimed is:

1. A method of characterizing an image comprising:
   storing at least one reference image characterized via an array of local image feature descriptors in which the local image feature descriptors are built according to at least circular data distribution information;
   obtaining a first image of an object; and
   characterizing, via execution of machine readable instructions in a processor, the first image via:
      detecting within the first image a plurality of interest points; and
      building a local image feature descriptor for each interest point, including:
         mapping information about the respective interest points according to at least circular data distribution information,
   determining if the first image matches the at least one reference image via comparing, via at least the circular data distribution information, the local image feature descriptors of the first image with local image feature descriptors of the at least one reference image; and
   confirming, positively or negatively, an identity of the object in the first image,
   wherein based upon the determining and confirming, performing a computer vision application including image stitching.

2. The method of claim 1, wherein each respective local image feature descriptor is built according to a local image patch centered at one of the respective interest points, and wherein mapping information includes mapping oriented gradients for each local image patch.

3. The method of claim 2, wherein mapping information according to at least circular data distribution information includes mapping the oriented gradients according to an array of statistics including at least circular means and variances of a mixture of circular normal data distributions.

4. The method of claim 1, comprising:
   modeling the circular data distribution information via an expectation maximization function.

5. The method of claim 1, comprising:
   performing the building of the local image feature descriptor according to a scale-invariant feature transform function.

6. A system for comparing local image features comprising:
- a processor to execute stored machine readable instructions causing mapping interest points of a first image via:
  - a reference module to provide at least one stored reference image characterized via an array of local image feature descriptors, which are built according to at least circular data distribution information;
  - an interest point detector to identify interest points in the first image;
  - a local image descriptor module to build a local image feature descriptor for each identified interest point based on parameters of the respective interest point, including a local image patch centered at one of the respective interest points, and based on parameters of a neighborhood surrounding the respective interest point,
    - wherein the local image feature descriptor includes information relating to the interest points mapped based on oriented gradients for each local image patch according to a histogram based on at least circular means and variances of a mixture of circular normal data distributions; and
  - a matching module to compare and match, via at least the circular data distribution information, the local image feature descriptors of the first image to the local image feature descriptors of the at least one stored reference image,
  - a computer vision module to perform a computer vision application based on the comparing and matching of the matching module, the computer vision application including image stitching.

7. The system of claim 6, wherein the mixture of circular normal data distributions is modeled via a single iteration of an expectation maximization function.

8. An image processing system:
- an imager to capture at least a first image of an object;
- a non-volatile memory to store the first image; and
- an image evaluation unit including a processor to execute machine readable instructions, stored in the non-volatile memory, causing characterizing the first image via:
  - a local image feature detector to identify interest points in the first image;
  - a local image feature descriptor module to build a local image feature descriptor for at least some of the identified interest points, wherein the local image feature descriptor includes interest point information represented by circular data distribution information; and
  - a matching module to compare and match the local image feature descriptors of the first image to local image feature descriptors stored in a non-volatile database of references images, with the stored local image feature descriptors based on at least circular data distribution information,
- a computer vision module to perform a computer vision application based on the comparing and matching of the matching module, the computer vision application including image stitching.

* * * * *